United States Patent [19]
Schneeberger

[11] Patent Number: 5,492,054
[45] Date of Patent: Feb. 20, 1996

[54] COFFEE MAKER WITH A METERING DEVICE

[75] Inventor: Gérard Schneeberger, Bülach, Switzerland

[73] Assignee: Prodiana AG, Switzerland

[21] Appl. No.: 289,192

[22] Filed: Aug. 11, 1994

[30] Foreign Application Priority Data

Aug. 11, 1993 [CH] Switzerland .......................... 02381/93

[51] Int. Cl.[6] .................................................. A47J 31/00
[52] U.S. Cl. ........................ 99/289 R; 99/287
[58] Field of Search .............. 99/289 R, 289 T, 99/289 D, 289 P, 287, 286, 290, 297, 199, 300, 302 R, 302 P; 426/433

[56] References Cited

U.S. PATENT DOCUMENTS

| | | | |
|---|---|---|---|
| 3,203,340 | 8/1965 | Totten | 99/289 R |
| 4,188,863 | 2/1980 | Grossi | 99/289 R |
| 4,191,101 | 3/1980 | Ogawa | 99/289 R |
| 4,797,296 | 1/1989 | Meier | 99/289 R |
| 5,197,372 | 3/1993 | Schneeberger . | |

FOREIGN PATENT DOCUMENTS

| | | |
|---|---|---|
| 0139964 | 10/1987 | European Pat. Off. . |
| 0486434 | 11/1991 | European Pat. Off. . |
| 1518759 | 3/1968 | France . |
| 2301214 | 9/1976 | France . |
| 9214283 | 2/1993 | Germany . |

Primary Examiner—Robert W. Jenkins
Attorney, Agent, or Firm—Speckman, Pauley & Fejer

[57] ABSTRACT

A coffee maker which operates with at least one metering device having an adjustable wall, which varies the metering volume of the metering chamber. The metered powdered beverage is emptied through a movable flap and falls through a pouring funnel into an extraction chamber of an extraction cup. During the brewing process, a displaceable extraction piston is located in the brewing chamber. The movable wall and the movable extraction piston are actuated via a single operating element which acts on a transmission means.

10 Claims, 3 Drawing Sheets

COFFEE MAKER WITH A METERING DEVICE

BACKGROUND OF THE INVENTION

1. Field of the Invention

This invention relates to a device for making hot beverages by extraction, particularly for making coffee, with at least one metering device for a powdered beverage, a hot water preparation element and a water pump, as well as an ejector for removing used powdered beverage from a movable extraction cup, which can be fastened on a movable holder which is situated in a guide track and can therefore bring the extraction cup into a position in which it comes into operational engagement with an extraction piston.

2. Description of Prior Art

A device of the above mentioned type is known, for example, from Swiss Patent Reference CH-A-681198. The device described therein describes a particular kind of guidance of the extraction cup in a horizontal and a vertical movement, which results in a particularly simple construction of the coffee maker. The machines of interest here are machines predominantly used in households, which must be designed considerably more simply and cost-effectively than corresponding coffee makers for the restaurant business.

Particularly elaborate machines for restaurant use allow the variation of the strength of the extracted beverage. This requires adjustable metering of the powdered beverage and adaptation of the volume of the extraction cup, wherein the relative position of the extraction cup and of the extraction piston engaging it are adjustable as a function of the metered powdered beverage. In the commercially employed coffee machines mentioned, this relative displacement of the extraction cup and the extraction piston with respect to each other is performed by complex electronic controls and corresponding hydraulic or electric motor-driven displacement devices. The available spatial conditions on household machines for the preparation of hot beverages by extraction do not permit such elaborations.

Commercial coffee makers are usually equipped with a grinder which is driven at a constant speed. The ground coffee is moved from the grinder directly to the extraction cup. A timer control meters the amount of coffee which is placed into the extraction cup. As a rule, the starting of the motor of the grinder is controlled. Given the already mentioned requirement that the motor run at constant rotational speed, it is possible to meter the amount of ground powdered coffee by changing the switch-on time. To transfer this concept to household coffee makers is impractical because of the costs associated with an elaborate, rotational speed monitored induction motor.

Metering devices are often used in connection with the devices of the previously mentioned type for household use which pass on the ground powdered beverage in a fixed amount to the extraction cup. A device for metering powdered coffee is known from French Patent Reference FR-A1518759, wherein the grinder places the ground powdered coffee directly into a metering chamber which has a pressure-sensitive elastically deformable wall element on which a signal transmitter is disposed, which generates a signal as a function of the elastic deformation of the wall element. Another embodiment of such a metering device is disclosed in European Patent Reference EP-A-139964, wherein the wall element is a pressure-sensitive elastically deformable diaphragm which, when the desired fill level has been attained, acts on a signal transmitter which simultaneously unlocks a pivotal bottom element.

French Patent Reference FR-A-2301214 also shows such a metering device, wherein the grinder passes the ground powdered beverage directly into two metering chambers of different sizes. Each metering chamber again has a movable wall acting on a signal transmitter. The position of the movable walls can be changed and set over a minimal range with a screw driver and a counter nut. However, this adjustment is performed at the factory and is later sealed and cannot be affected by the user of the device.

With the known devices for the preparation of hot beverages, in particular coffee, of the previously mentioned type, the extraction cup and extraction piston assume a defined fixed position with respect to each other when they are in the brewing position.

It is known that in the course of the extraction process the powdered beverage expands. Accordingly, it has been proposed to seat the filter plate in the extraction cup movably and to interpose a spring. The movement of the powdered beverage during expansion can be intercepted in this way. Such solutions are disclosed in European Patent Reference EP-A-486434 and German Patent Reference DE-U-9214283, for example.

SUMMARY OF THE INVENTION

None of the known devices designed for household machines disclose the option of changing the strength of the extracted beverage by varying the amounts of the powdered beverage. It is one object of this invention to propose a solution to this problem which is as simple and cost effective as possible.

The above and other objects are achieved by a device of the previously mentioned type having at least one metering device for a powdered beverage, a hot water preparation element and a water pump, a moveable extraction cup which can be fastened on a moveable holder that is slidably mounted within a guide track, all in order to move the extraction cup into a position in which it operationally engages with an extraction piston.

Further advantageous embodiments in accordance with this invention are described in detail in the subsequent description. In particular, the device of the invention permits an operation with two metering devices, wherein one can be supplied by a grinder and the other from a reservoir.

BRIEF DESCRIPTION OF THE DRAWINGS

A preferred exemplary embodiment of this invention is represented in the drawings and is explained in the description, wherein.

DESCRIPTION OF PREFERRED EMBODIMENTS

Figure 1:
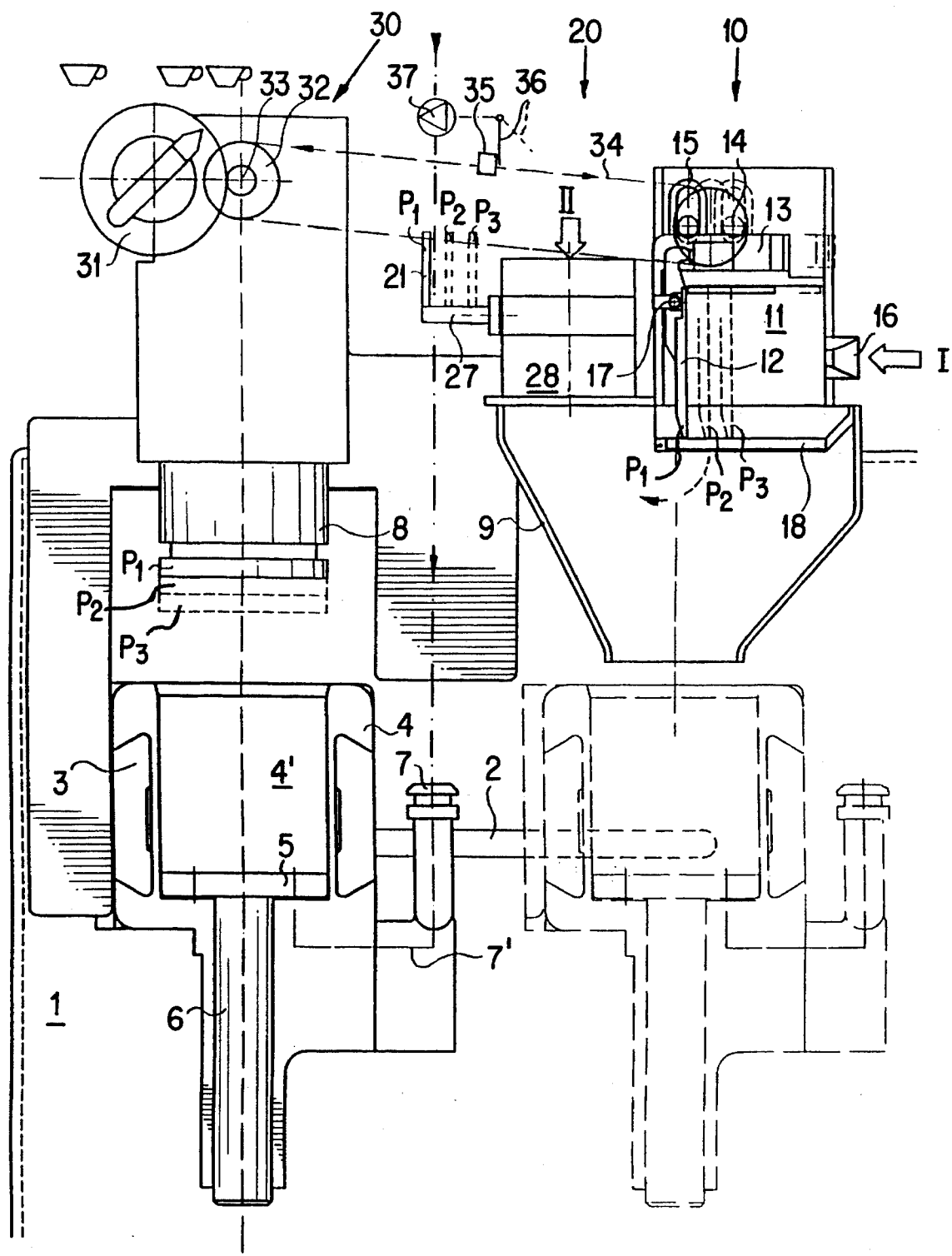
FIG. 1 shows a partial front view of one preferred embodiment of the device of this invention, wherein an extraction cup, an extraction piston and a movable wall of a metering device are shown in different positions.

A device for preparing hot beverages by extraction, similar to that which is known from Swiss Patent Reference CH-A-681198, for example, is shown in FIG. 1. Such machines are primarily used for making coffee. Such devices are customarily called fully automatic coffee makers.

A partial front view is shown in FIG. 1, with the housing, the mechanical drive mechanism, the grinder, the water reservoir and the associated water pump and instantaneous water heater omitted from FIG. 1. The means required for ejecting the used powdered beverage and the collecting pot are also not shown in the drawings. These are all means known from different embodiments in various conventional automatic coffee makers for household use.

A base plate is identified by the reference numeral 1, on which essential parts of the device according to this invention are mounted directly or indirectly. A guide path 2 has been cut into the base plate 1, which is used to guide a holder 3 in which the extraction cup 4 is supported. The extraction cup 4 is schematically shown here, so that it is possible to see the brewing chamber 4' of the extraction cup 4. A movable filter plate 5 is seated in the brewing chamber 4' and is engaged by an ejector 6. The brewing water can enter the brewing chamber 4' via a pluggable connector 7 and the line 7', symbolically shown by dashed lines in FIG. 1, through the filter plate 5. At the appropriate time, the hot water flows through the powdered beverage lying on the filter plate 5. In the position shown by dashed lines, on the right side in FIG. 1, the brewing chamber 4' of the extraction cup 4 is filled with a metered amount of powdered beverage and is then guided over the guide path 2 to the position on the left underneath the height-adjustable extraction piston 8, and is moved upward thereafter. In the process, the extraction piston 8 enters the brewing chamber 4' of the extraction cup 4. The powdered coffee in the extraction cup is compressed to a predetermined amount.

During the upward movement of the extraction cup 4 the connector 7 is automatically coupled to the brewing water preparation device. The hot water is then pushed upward through the filter plate 5 and through the compressed powdered beverage and then exits through a spout, not shown in FIG. 1.

Two powdered beverage metering devices 10, 20 are shown in the right half of FIG. 1, both of which empty the metered amount of powdered beverage into a pouring funnel 9 in this example. The metered powdered beverage moves from the pouring funnel 9 into the brewing chamber 4' of the extraction cup 4 shown in dashed lines. The first metering device, indicated by element reference numeral 10 as a whole, is supplied from the side by a grinder, not shown in FIG. 1. The part identified by I is intended to symbolize this supply. The powdered beverage moves from the grinder to the metering chamber 11 via the supply line 16. The cuboid metering chamber 11 is surrounded by five fixed sidewalls, two of which form an angle at a bottom flap 18, and is also bound by a movable wall 12. Thus, the volume of the metering chamber 11 is changed by means of the movable wall 12. The movable wall 12 is formed on a carriage 13 which performs the actual pushing motion. The maximum filling position $P_1$ is drawn in solid lines in FIG. 1, while the dashed lines identify position $P_2$ which represents an intermediate position and position $P_3$ which represents a minimum position. These volume changes take place within one order of magnitude, so that the metering chamber 11 can receive between 5 and 15 grams of ground coffee, for example.

Once the metering chamber 11 has reached the desired complete fill level, the movable wall 14 presses a microswitch 17, also mounted on the carriage 13. The microswitch 17 emits a control signal which causes the grinder to be shut off and also causes the bottom flap 18 of the metering chamber 11 to be opened by means of an electromagnet, not shown in FIG. 1.

If the device in accordance with this invention is essentially only used for making coffee, this single metering device 10 can be sufficient. However, if the device is intended to make regular as well as decaffeinated coffee, or another beverage, a second metering device 20 can be used. Such a second metering device 20 can be easily disposed directly adjacent the first metering device 10 above the same pouring funnel 9. The second metering device 20 has a special structure, which is represented in simplified form in FIGS. 3 to 6. The second metering device 20 is in direct operational connection with a funnel-shaped reservoir 50 which is used to receive an already ground powdered beverage. The essential component of the metering device illustrated here comprises an adjustment cylinder 25. This is designed to be hollow-cylindrical in a frontal area. The front face wall of the hollow-cylindrical part of the adjustment cylinder 25 is missing and is formed by the fixed wall 23 which itself is a part of the housing 28. A partially cylindrical wall 26 leaves an opening 29. The hollow-cylindrical part of the adjustment cylinder 25 is bound by a cylindrical face wall 24.

Figure 4:
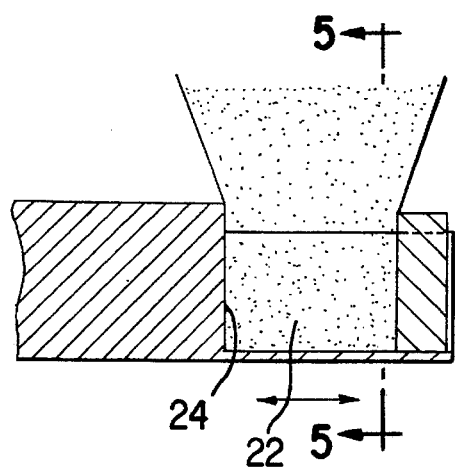
FIG. 4 shows the same representation as shown in FIG. 3, of the metering of a maximum amount of powdered beverage.
Figure 6:
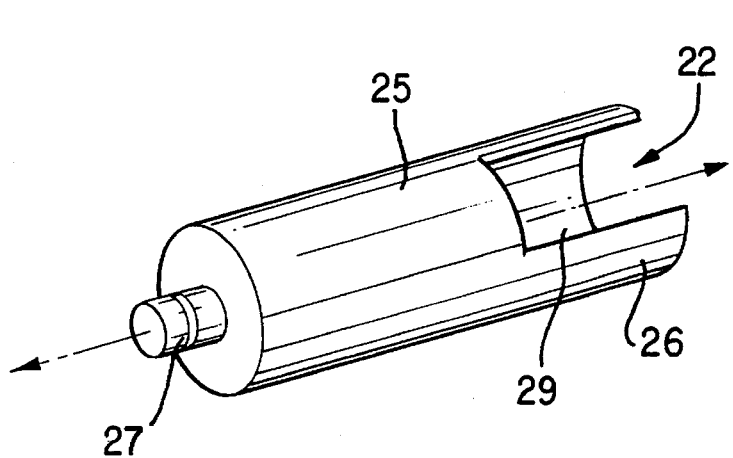
FIG. 6 shows the displaceable metering cylinder of the metering device of FIGS. 3 to 5 in a perspective view.
Figure 5:
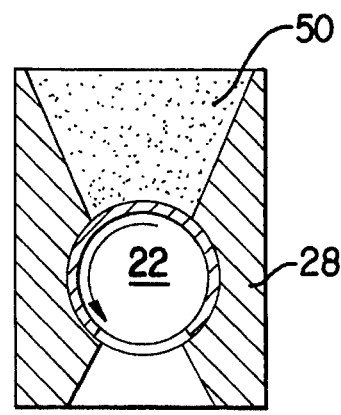
FIG. 5 shows a schematic representation of the device in accordance with FIG. 4, in a section taken along the line A—A.

The entire adjustment cylinder 25 is seated in the housing 28 axially displaceable as well as rotatable. In the position in accordance with FIG. 3, the closed cylinder part enters the housing 28 relatively deeply so that the free space remaining between the face wall 24 and the fixed wall 23, which forms the metering chamber 22, is relatively small. The maximum metered amount is shown in FIG. 4. In the positions in accordance with FIGS. 3 and 4, the ground powdered beverage falls into the metering chamber 22. The jacket wall 26 of the partial cylinder is pushed in front of the narrow outlet opening of the funnel-shaped reservoir 50 by rotating the adjustment cylinder 25. When the adjustment cylinder 25 is rotated by 180°, the powdered beverage falls out of the metering chamber 22 into the pouring funnel 9 which is disposed under it. At the same time the jacket wall 26 of the partial cylinder prevents more powdered beverage from flowing out. The adjustment cylinder 25 remains in this position until a defined amount of powdered beverage is again metered. In this case the adjustment cylinder 25 is again first displaced in the axial direction to determine the metered amount before the adjustment cylinder 25 is again rotated until the opening 29 in the jacket wall 26 is oriented toward the reservoir 50.

Figure 2:
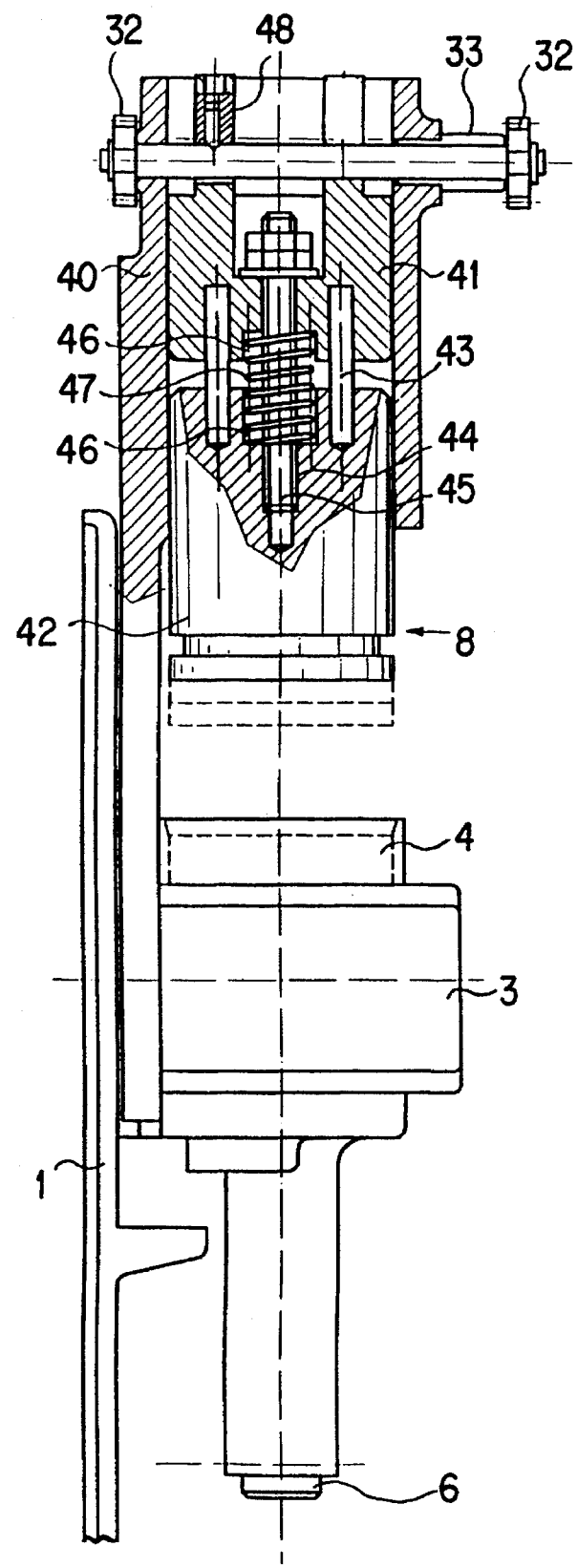
FIG. 2 shows a side view of the extraction cup and the extraction piston, wherein the extraction piston is shown in a partial cross-sectional view.
Figure 3:
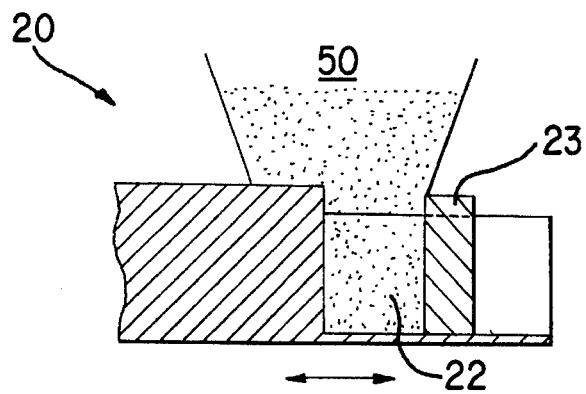
FIG. 3 shows a schematic partial representation of a metering device in a position for metering a minimum amount of powdered beverage, according to one preferred embodiment of this invention.

FIG. 2 shows a side view of the device of FIG. 1 with the metering device left out. The base plate is again indicated by 1. The extraction cup 4 is again in a lower position and is again supported by the holder 3. The extraction piston 8 located above the extraction cup 4 is shown in a partial cross section.

The extraction piston 8 is guided in a piston guide 40 which is supported on the base plate 1. Here, the extraction piston 8 is embodied to be in two parts. During the upward movement of the extraction cup 4, the lower piston part 42 enters its extraction chamber 4'. The upper piston part 41 can be moved up and down with respect to the piston guide 40. Both piston parts 41, 42 are connected to each other by means of guide bolts 43 which are seated in respectively aligned bores in the upper as well as the lower piston part 41, 42. In addition, the two piston parts 41, 42 are centrally connected with each other via an adjustment spindle 45. The lower piston part 42 has an appropriate threaded bore 44 into which the adjustment spindle 45 is mated. The upper piston part 41 has a simple passage through which the adjustment spindle 45 projects. The relative position with respect to each other can be adjusted and secured by means of tightening nuts. The adjustment spindle 45 is concentrically surrounded by a pressure spring 47 which is seated in corresponding receiving bores 46 in both piston parts 41, 42. The pressure spring 47 is pre-stressed in such a way that it is not compressed by the pressure during compression of the ground powdered beverage when the extraction cup 4 and the extraction piston 8 move toward each other. Only in the course of the actual extraction process, wherein the water is pushed through the powdered beverage, does the powdered beverage expand, because of which the pressure in the brewing chamber 4' rises, so that now the increased pressure exceeds the pre-stressing force of the pressure spring 47 and the lower piston part 42 can yield in the direction toward the piston part 41.

Following the completed brewing process, the extraction cup 4 briefly remains in the original position of the brewing process, while the water pump for the brewing water is switched off and therefore the water pressure is released. The water remaining in the used powdered coffee is then pressed out by the pressure of the pressure spring 47 so that the lower piston part 42 again slides a short distance downward. If now the extraction cup 4 with the holder 3 is pulled downward, the pressure spring 47 can relax again until it is pre-stressed. It is assured by means of this method that the used powdered beverage no longer contains water and that a cake of dry filtered beverage can be ejected. It is thus assured that during ejection the cake of filtered beverage does not fall apart and soil the entire machine.

Due to the previously described construction of the device in accordance with this invention, it is now possible to realize an extremely simple and cost-effective means for synchronizing the adjustment of the metered volume of the powdered beverage with the position of the extraction piston 8. It is, of course, not absolutely necessary that the extraction piston 8 be made in two parts, but such a preferred embodiment permits a considerably larger variation of the metered volume of the powdered beverage.

This can be extended to include the possibility of operating with a sufficiently large metered amount of powdered coffee so that two cups of coffee can be made simultaneously. This has not yet been accomplished in known household machines.

Regarding the synchronous adjustment of the metering devices 10, 20 and the extraction piston 8, reference is again made to FIGS. 1 and 2. In their totality, the means for adjusting are identified as transmission means 30. They comprise an operating element 31 on the outside of the housing and visible to the user, shown as a turning knob, as well as a toothed belt 34. The toothed belt 34 runs over a belt wheel 32 mounted on a shaft which is seated in the piston guide housing 40. A pinion gear 33 has also been placed on this shaft, on which the operating element 31 acts. It is possible to generate a 180° turn of the belt wheel 32 with a 90° turn of the operating element 31. The toothed belt 34 moves as a result of rotation of the belt wheel 32. A second belt wheel is seated on a shaft which is fastened in the base plate 1. This belt wheel has a cam 14 projecting through a cam bracket 15. The cam bracket 15 is disposed on the previously described carriage 13. A 180° turn of the cam 14 around the shaft of the second belt wheel thus moves the carriage 13 from the minimum position to the maximum position. Accordingly, by means of the movement of the carriage 13, the movable wall 12 of the first metering device 10 is also displaced. Any arbitrary intermediate position $P_2$ can also be set between the minimum position $P_3$ to the maximum position $P_1$. This means that coffee of any desired strength can be set.

If a second metering device 20 is provided, it can also be placed into the desired metering positions $P_1$ to $P_3$ by means of the toothed belt 34. All that is required for this is a cam 21, symbolically represented in FIG. 1, which is fixedly connected with the toothed belt 34 and is also connected with the pulling and rotating shaft 27 of the adjustment cylinder 25. Other adjustment possibilities are also possible by using the movement of the toothed belt 34.

When actuating the operating element 31, a shaft seated in the piston guide 40 is turned by means of the pinion gear 33, as previously discussed. As can be seen in FIG. 2, an eccentric 48 is fastened, fixed against relative rotation, on this shaft. Thus the eccentric 48 is also rotated when this shaft is rotated and displaces the two piston parts 41 and 42 downward in the piston guide 40. In this way there is a direct connection between the position of the operating element 31, the displaceable wall 12 or the displaceable cylindrical front face 24 and the height of the extraction piston 8. The smaller the metered volume, or the smaller the metering chamber 11 or 22, the deeper the extraction piston 8 penetrates into the extraction cup 4.

This displacement option can additionally be used to trigger the water pump 37. For example, it is possible to dispose a carrier 35 on the toothed belt 34 which, in the range of the maximum metered amount, acts on a switch 36 which provides the water pump with a control signal for conveying double the amount of water.

In a particularly simple embodiment of the device in accordance with this invention, it is also possible to use only the second metering device 20 and a reservoir 50. In this case a grinder can be omitted. With a second, somewhat more luxurious machine, it is possible to use only the first metering device, which cooperates with a grinder. In this way the coffee is made from freshly ground coffee beans. In the most luxurious model both metering devices can be used, as shown here, by means of which all options can be met. It is, of course, possible to realize the displaceability of the extraction piston 8 in a one-piece extraction piston. The transmission means here described, namely the toothed belt 34, the belt wheels 32, the shaft with the eccentric 38, and the pinion gear 33, of course, only represent one preferred embodiment of this invention. For example, the toothed belt 34 could be replaced by a rod which eccentrically engages an actuation wheel which is directly connected with the carriage 13, and the actuation wheel could act via an angular gear or a worm drive on a spindle or a toothed rack which act on the extraction piston 8. The basic concept of this invention rests in the direct coupling of the metered amount of the powdered beverage with the simultaneous corresponding displacement of the extraction piston 8.

I claim:

1. In an apparatus for making hot beverages by extraction, the apparatus having at least one metering device (10, 20) for a powdered beverage, a hot water preparation element and a water pump (37), a movable extraction cup (4) which can be fastened on a movable holder (3) guided in a guide track (2) to bring the extraction cup (4) into a position in which the extraction cup (4) operationally engages with an extraction piston (8), the improvement comprising: the at least one metering device (10, 20) having a movable wall (12, 24), transmission means for moving the movable wall (12, 24) and simultaneously displacing the extraction piston (8) in a movement direction of the extraction cup (4) to maintain a synchronous relationship between the metered amount of the powdered beverage and a distance between the extraction piston (8) and the extraction cup (4).

2. In an apparatus in accordance with claim 1, wherein the transmission means comprise: a common operating element (31), a shaft which rotates when acted upon by the common operating element (31), an eccentric (48) seated on the shaft which displaces the piston (8) when the shaft rotates, a belt wheel (32) connected to the shaft, and a toothed belt (34) which rides on the belt wheel (32) and moves when the shaft is rotated.

3. In an apparatus in accordance with claim 2, wherein the toothed belt (34) of the transmission means moves at least one cam (14, 21) to act on the movable wall (12, 24) of the at least one metering device (10, 20).

4. In an apparatus in accordance with claim 1, wherein the at least one metering device (10) has a metering chamber (11), and the metering chamber (11) has a movable wall (12) which runs on a carriage (13) upon on which a microswitch (17) is disposed.

5. In an apparatus in accordance with claim 1, wherein the at least one metering device (20) has a cylindrical chamber (22) formed by a partially cylindrical jacket wall (26) and a movable cylinder end wall (24), cylindrical chamber (22) connected in one piece with the cylindrical jacket wall (26), and a fixed wall (23) opposite the cylinder end wall (24).

6. In an apparatus in accordance with claim 1, having two metering devices (10, 20), wherein one of the two metering devices (10) is fed by a grinder, the other of the two metering devices (20) is supplied from a reservoir (50), and the two metering devices terminate in a common pouring funnel (9).

7. In an apparatus in accordance with claim 6, wherein the two metering devices (10, 20) have different structures and the one metering device (10) with the movable wall (12) is supplied by a grinder and the other metering device (20) with the movable cylinder wall (24) is supplied from a reservoir (50).

8. In an apparatus in accordance with claim 1, wherein the extraction piston (8) comprises two piston parts (41, 42), and the two piston parts (41, 42) are connected to each other in a guided (43) and spring-loaded (47) manner.

9. In an apparatus in accordance with claim 1, wherein in a maximum powdered beverage metering range the water pump (37) is controlled by the operating element (31), to approximately double the amount of water conveyed.

10. In an apparatus in accordance with claim 9, wherein a carrier (35) is disposed on the transmission means (30), which acts on a control switch (36) of the water pump (37).

* * * * *